(No Model.) 2 Sheets—Sheet 1.
J. G. KENYON.
VEHICLE.
No. 392,866. Patented Nov. 13, 1888.
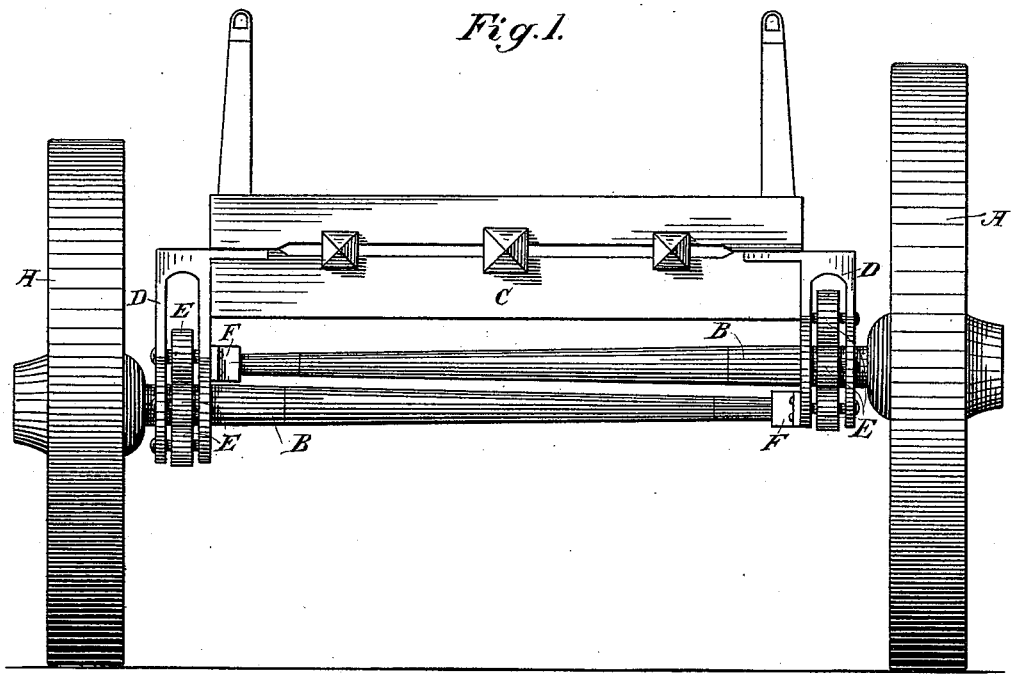
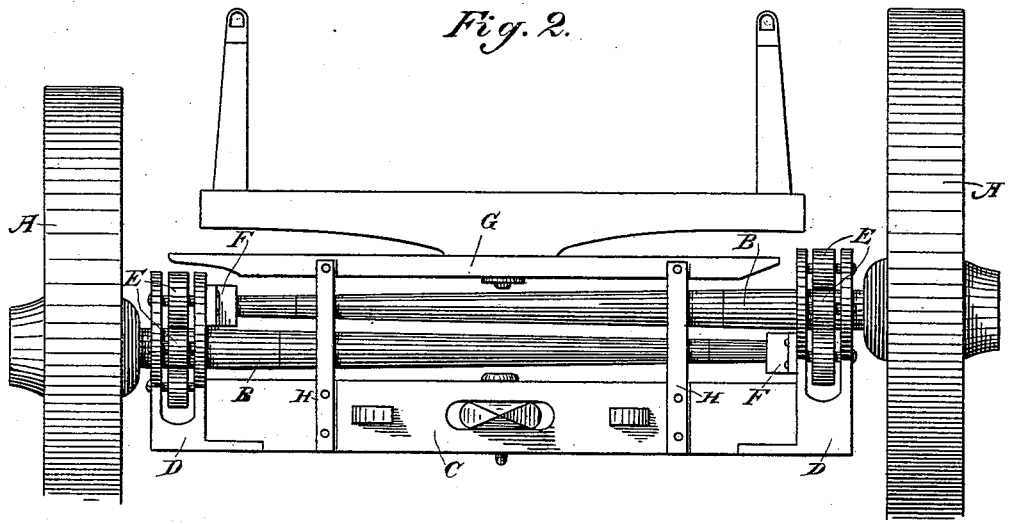
Witnesses,
Geo. H. Strong.
J. H. Towne.
Inventor,
J. G. Kenyon,
By Dewey & Co.
Atty (No Model.) 2 Sheets—Sheet 2.

J. G. KENYON.
VEHICLE.

No. 392,866. Patented Nov. 13, 1888.

Witnesses,
Geo. H. Strong

Inventor,
J. G. Kenyon.
By Dewey & Co.
Atty.

UNITED STATES PATENT OFFICE.

JACOB G. KENYON, OF PORT KENYON, CALIFORNIA.

VEHICLE.

SPECIFICATION forming part of Letters Patent No. 392,866, dated November 13, 1888.

Application filed April 28, 1888. Serial No. 272,189. (No model.)

*To all whom it may concern:*

Be it known that I, JACOB GARDNER KENYON, of Port Kenyon, Humboldt county, California, have invented an Improvement in Vehicles; and I hereby declare the following to be a full, clear, and exact description of the same.

My invention relates to the class of vehicles, and especially to the axles and connections thereof.

My invention consists in the novel construction and arrangement of independent axles or wheel-spindles, their bearings, their supports, and other details, all of which I shall hereinafter fully describe.

The main objects of my invention are to reduce the friction and to steady the draft, these objects, together with others, being attained in the manner and by the means to be described.

Figure 3:
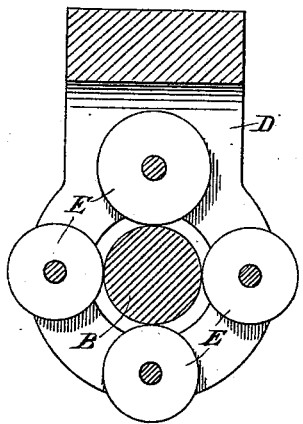
Figure 4:
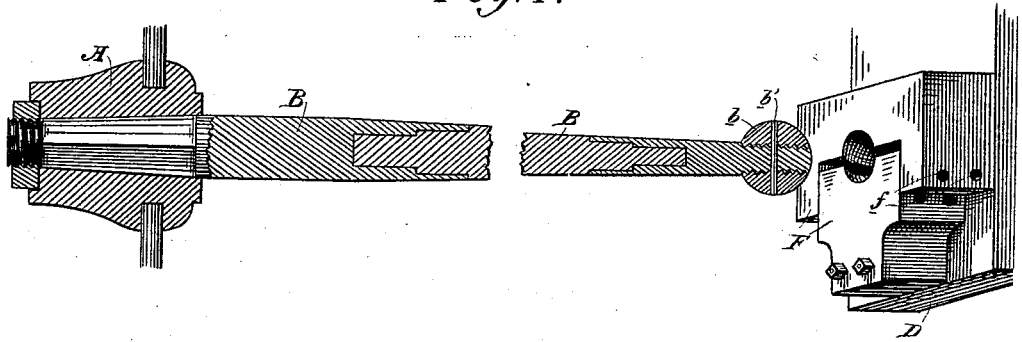

Referring to the accompanying drawings for a more complete explanation of my invention, Figure 1 is a rear elevation of a vehicle, showing my improvements. Fig. 2 is a front view. Fig. 3 is a side view of the anti-friction bearing. Fig. 4 is a view of the axle or spindle, showing the ball-journal at its end, and a view of the two-part box, in which the ball fits.

A A are the wheels of a vehicle. Each has an axle or spindle, B, upon which it is made fast, so that both wheel and axle turn together. The rigid connection between the wheel and its axle or spindle may be made in any suitable manner, a convenient way being to square the end of the axle and pass it through a square hole in the wheel-hub and secure it by a nut. These axles or spindles B pass by each other in opposite directions, and to avoid interference I may either set one wheel a little behind the other, so that its axle may pass by the other axle, the two lying in the same horizontal plane, or I may arrange them (as I prefer to do) so that one axle or spindle passes under the other, as shown, by making the diameter of the wheel on one side enough less than that of the wheel on the other side to lower its hub sufficiently.

C is the frame of the vehicle, and to its sides are firmly secured the downwardly-extending bearing-plates D, through which each axle or spindle near its wheel end passes. In these plates are mounted the anti-friction rollers or wheels E, which bear about the journal of each axle or spindle and form the boxing for it. One of these wheels is above the journal, one below, and one on each side. The one above carries the weight, the one below limits the upward jolt, the one in front is for backing, and the one behind is for pulling.

Upon the inner surfaces of the bearing-plates D are firmly bolted the boxes F, in which the outer end of each spindle or axle is journaled and by which it is supported. This box, though it may be of any suitable character, I prefer to make in two sliding parts, Fig. 4, forming the journal-socket between them. Upon the end of the spindle or axle is secured a ball, *b*, preferably of steel, which is held to place by a pin, *b'*, but may be readily removed for the substitution of another when necessary. The ball *b* fits in the two-part box and is confined therein with a suitable amount of setting up by means of the cross-bolt *f*, which holds the two parts of the box together.

The axles or spindles B, I prefer to make of wood, Fig. 4, ironed at both ends, though they may be made in any suitable manner or of any suitable materials.

The bearings for the wheel ends of the axles or spindles may be plain sockets instead of the anti-friction rollers or wheels.

In Fig. 2 I have shown the axles adapted to the forward wheels, where low draft is required. In this case the bearing-plates D rise from the ends of the frame C, which said frame is under the axles, and it is connected with the sand-board G above by the bars H. This construction can be applied to the hind wheels also, if desired.

Now it will be seen from the foregoing description that by this construction the main objects of my invention are attained. The friction is reduced mainly by the anti-friction bearings, but also by transferring the friction from the wheel-centers, where it usually is in vehicles, to the journals of the spindles. Steadiness and ease of draft are obtained by so mounting the wheels as to more effectively prevent their deflection from a straight line. In the ordinary construction, each wheel being rotary on its spindle, there is a constant tendency to deflection, either by reason of small obstructions or natural looseness, and this tendency produces a cramping and consequent friction, which affects the draft; but in my construction each wheel is better controlled by its axle or spindle, which, serving as a lever, is sufficient to resist the deflecting tendency and to keep the wheel perfectly straight.

In my vehicle the weight of the load rests and the draft is upon the spindle or axle near the wheel. I obviate the removal of the wheel from the axle to grease it and prevent any tendency to heat.

In passing along a hillside with a heavy load the wheels of a common vehicle bind tightly and produce great friction on the spindle, as the wheel acts as a lever; but in my construction the axles or spindles, acting as long levers, the wheels, as before said, are easily controlled, thus greatly reducing friction.

Having thus described my invention, what I claim as new, and desire to secure by Letters Patent, is—

1. In a vehicle, the combination of a wheel and an axle or spindle with which it is connected so as to rotate together, and an opposing wheel of smaller diameter, having an axle or spindle connected with it so as to rotate together, said axles or spindles passing the one above the other and journaled in separate boxes near each side, substantially as described.

2. In a vehicle, opposing wheels, each having an independent axle so connected with it that wheel and axle shall rotate together, said axles passing by each other, in combination with the vehicle-frame, the bearing-plates secured thereto on each side, the anti-friction roller or wheel-boxes in each plate for the wheel end of each axle, and boxes carried by the plates for the outer end of each axle, substantially as described.

3. In a vehicle, opposing wheels, each having an independent axle so connected with it that wheel and axle shall rotate together, said axles passing each other, in combination with the vehicle-frame, the bearing-plates carried thereby and in which the wheel ends of the axles are journaled, and the two-part adjustable box on each bearing-plate and ball on the outer end of each axle journaled in said box, substantially as described.

4. In a vehicle, opposing wheels, each having an independent axle so connected with it that wheel and axle shall rotate together, said axles passing each other and having on their outer end a removable ball screwed thereon and secured by a pin, in combination with the vehicle-frame, the bearing-plates carried thereby on each side and in which the wheel ends of the axles are journaled, and the two-part adjustable box secured to the bearing-plates and in which the balls of the axles are journaled, substantially as described.

5. In a vehicle, opposing wheels, each having an independent axle so connected with it that wheel and axle shall rotate together, said axles passing each other, in combination with the vehicle-frame below the axles, the bearing-plate on each side and in which the wheel end and the outer end of the axles are journaled, the sand-board above, and connecting-bars joining the sand-board with the frame, substantially as described.

In witness whereof I have hereunto set my hand.

JACOB G. KENYON.

Witnesses:
S. H. NOURSE,
H. C. LEE.